Sept. 20, 1971  K. COOPER  3,605,567
PISTON AND CYLINDER DEVICES
Filed Aug. 12, 1969  2 Sheets-Sheet 1
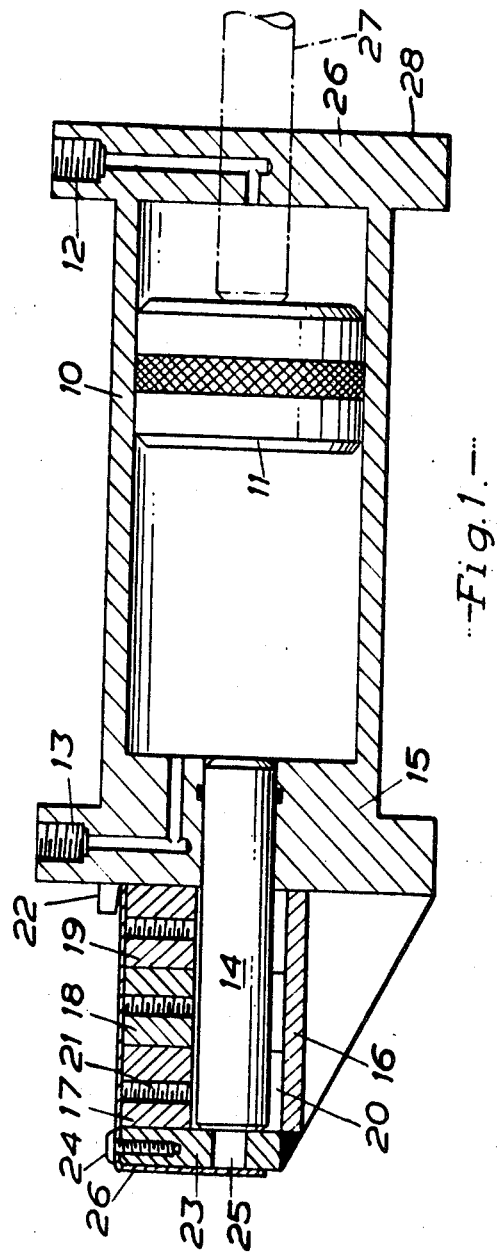
INVENTOR:
KENNETH COOPER,
BY
Berman, Davidson & Berman,
ATTORNEYS.

Sept. 20, 1971  K. COOPER  3,605,567
PISTON AND CYLINDER DEVICES
Filed Aug. 12, 1969  2 Sheets-Sheet 2
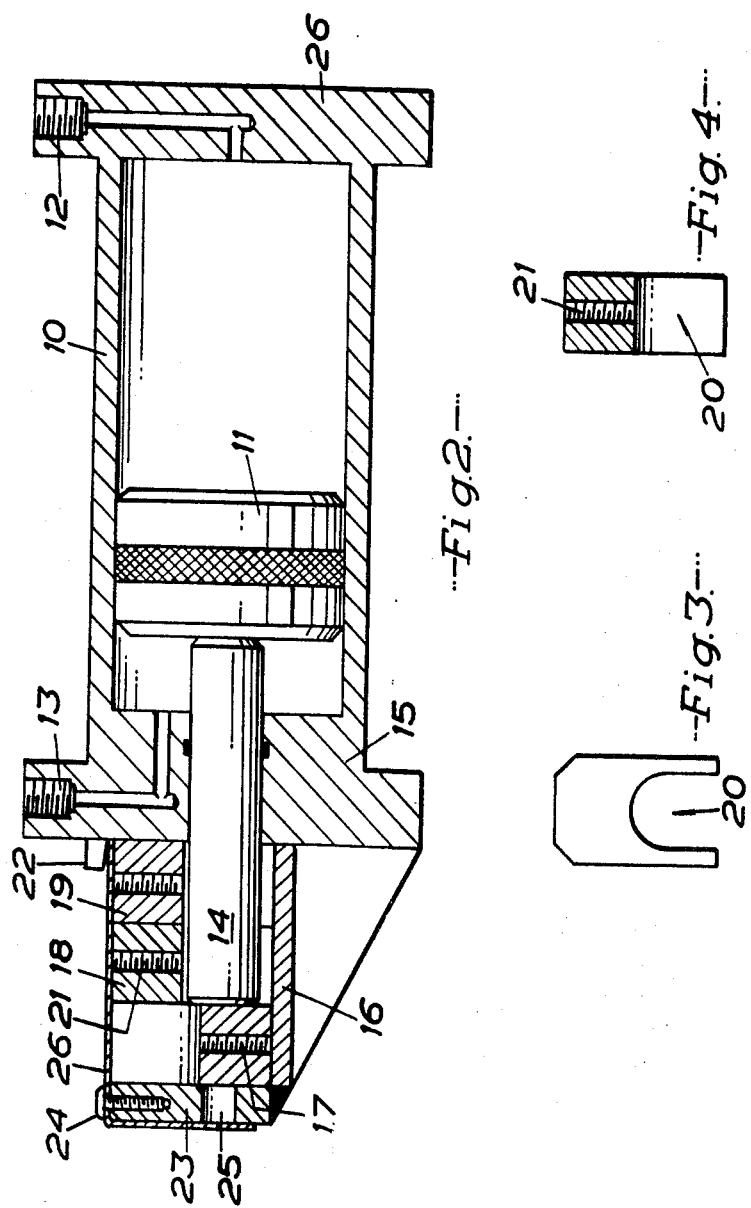
INVENTOR:
KENNETH COOPER,
BY
Berman, Davidson & Berman.
ATTORNEYS.

3,605,567
PISTON AND CYLINDER DEVICES
Kenneth Cooper, Orrell, near Wigan, England, assignor to Gullick Limited, Wigan, England
Filed Aug. 12, 1969, Ser. No. 849,309
Claims priority, application Great Britain, Sept. 10, 1968, 42,900/68
Int. Cl. F01b 31/14
U.S. Cl. 92—13.4                     4 Claims

ABSTRACT OF THE DISCLOSURE

A piston and cylinder device has an adjustable stop arrangement for limiting the stroke of the piston. This adjustable stop arrangement comprises a casing and a plurality of stop elements located in said casing in alignment with each other and with a piston-rod-like member associated with the piston. The stop elements are removable from the casing and have two positions therein in one of which they embrace said piston-rod-like member so as not to obstruct movement of it and of the piston and in the other of which they obstruct movement of the piston-rod-like member. By re-arranging the stop elements in the casing the permitted stroke of the piston can be increased or decreased as required.

---

This invention is for improvements in or relating to piston and cylinder devices. Such devices may be used, for example, for the dispensing of measured or predetermined quantities of fluids or as hydraulic rams or jacks.

An object of the present invention is to provide a simple, reliable and accurate means for setting or predetermining the stroke of a piston and cylinder device and thus ensure a high degree of accuracy where it is used, for example, for dispensing measured quantities of fluid.

According to the present invention there is provided a piston and cylinder device having a stroke limiting means comprising a plurality of stop elements and means for locating said stop elements out of the way of a stroke-making member of the device or any one or more of them in the way of said member.

According to a further feature of the invention there is provided a piston and cylinder device having a stroke limiting means comprising a plurality of stop elements and means for locating said stop elements in line and out of the way of a stroke-making member of the device or any one of them laterally out of said line and in the way of said member.

In one preferred embodiment of the invention the stop elements are shaped so that when located in line they embrace a stop-rod for the piston of the device and when out of line are in the way of or in alignment with said stop-rod. With this arrangement the stroke of the piston and cylinder device is determined by the position in the line of the stop element selected to be in the way of or in alignment with the stop-rod.

In one preferred embodiment of the invention the stop elements are housed in and are located by means of a housing or box on one end of the piston and cylinder device, the stop elements being invertable, in said housing or box, from an operative to an inoperative position and vice versa.

One particular embodiment of the invention will now be described, by way of example, with reference to the accompanying drawings in which:

FIG. 1 is a sectional elevation of a piston and cylinder device having stroke limiting means according to the invention, said stroke limiting means being positioned so as to allow the device to make its maximum stroke, FIG. 2 is a view similar to FIG. 1 but with the stop limiting means arranged to limit the stroke of the device to some extent, and FIGS. 3 and 4 are detail views of one of the stop elements used in the arrangement shown in FIGS. 1 and 2.

The device shown in the drawings comprises a cylinder 10 in which works a free piston 11. The cylinder has ports 12 and 13.

An abutment member or stop-rod 14 is slidably supported in a fluid-tight manner in the end 15 of the cylinder.

Mounted on the end 15 of the cylinder is a housing or box 16 for a plurality (in this case three) of abutting stop elements 17, 18 and 19.

Each of the stop elements (see FIGS. 3 and 4) is an approximately rectangular block bifurcated at its lower part as indicated at 20 so as to fit over the abutment member or stop-rod 14. Each stop element has a tapped hole 21 for a purpose hereinafter to be described.

The stop elements are held in the housing 16 by means of a cover plate 26 which fits under a lug 22 on the end 15 of the cylinder and is secured to the end 23 of the housing or box 16 by means of a screw 24.

To allow for maximum movement of the piston 11, the stop elements are arranged as shown in FIG. 1. In other words, they are arranged so that they all, by their bifurcated parts 20, fit over the stop-rod 14. Thus, none of the stop elements obturates or is in alignment with the stop-rod 14 and the latter is inoperative as a stop for limiting movement of the piston 11 to less than its maximum stroke.

Presuming it is desired to limit the stroke of the piston 11 to some extent, then the stop element 17 is withdrawn from the housing 16, the cover 26 having been temporarily removed. Removal of this stop element is conveniently effected by means of a screw-threaded tool, which is conveniently the screw 24, temporarily screwed into the tapped hole 21. The stop-rod 14 is then pushed partially into the cylinder by means of a tool or rod manipulated through a hole 25 in the end plate 23. The stop element 17 is then inverted, so that its bifurcated part 20 is uppermost, and dropped back into the housing 16 following which the cover 26 is re-secured in position.

In this location of the stop element 17 it obturates or is in alignment with the stop-rod 14 and makes said rod effective as an abutment or stop for limiting movement of the piston 11 by the required amount.

Similar inversion or re-positioning of the stop element 18 will limit the stroke of the piston 11 by a further amount and similarly, inversion or re-positioning of the stop element 19 will limit the stroke of the piston by a still further amount.

For use as a dispensing device the piston 11 may be reciprocated in the cylinder 10 by pressure of the liquid to be dispensed, which, with a suitable known arrangement of valves, is applied alternately under pressure to the ports 12 and 13. When the liquid is supplied under pressure through the port 12 the piston 11 is moved to the left and discharges a measure of the liquid on the left-hand side of the piston through the port 13. When the liquid is supplied under pressure through the port 13 and the piston 11 is moved to the right the piston then discharges a measure of the liquid on its right-hand side through the port 12. It will be appreciated that the amount of liquid dispensed at each stroke of the piston 11 in both directions can be very accurately predetermined by an appropriate positioning of the stop element 17, 18 and 19.

For use as a jack or ram the piston 11 may be provided with, or arranged to act on a piston rod or the like, indicated in chain lines at 27, which passes in a fluid-tight manner through the end 28 of the cylinder 10, the cylinder being pressurised through the port 13 to cause actuation of the piston or through ports 12 and 13 where a double-acting ram is required.

I claim:

1. A piston and cylinder device having a stroke limiting means, for a stroke making member of the device, comprising a box on one end of the cylinder of the device, a stop-rod slidably mounted in said end of the cylinder and positioned so as to project into said box, and a plurality of stop elements one behind another in said box, each stop element being bifurcated so that it has a part to receive said stop-rod and a part to obstruct said stop-rod, each of said stop elements being invertable in said box between a position in which it straddles the stop-rod and provides passage therefor and a position in which it forms an abutment to stop the movement of the stop rod.

2. A piston and cylinder device as claimed in claim 1 wherein the stop elements have a screw-threaded hole for engagement by a screw-threaded tool to facilitate their withdrawal from the box.

3. A piston and cylinder device as claimed in claim 1 wherein the box has a removable cover.

4. A piston and cylinder device as claimed in claim 1 wherein an end of the box remote from the cylinder has an opening to receive a tool for pushing the stop-rod into the cylinder.

References Cited

UNITED STATES PATENTS

| | | | |
|---|---|---|---|
| 473,891 | 4/1892 | Becker | 92—13.4X |
| 1,138,621 | 5/1915 | Bowser | 92—13.4X |
| 1,530,356 | 3/1925 | Davis | 92—13.4X |
| 1,618,775 | 2/1927 | Neuls | 92—13.4X |
| 1,622,561 | 3/1927 | Baker | 92—13.4X |
| 3,354,790 | 11/1967 | Race | 92—59 |

MARTIN P. SCHWADRON, Primary Examiner

L. J. PAYNE, Assistant Examiner